E. COLE.
GRAVEL TRAP AND AIR CHAMBER.
APPLICATION FILED DEC. 8, 1909.

968,124.

Patented Aug. 23, 1910.

Witnesses:

Inventor:
Elnathan Cole
By Albert H. Merrill
atty.

UNITED STATES PATENT OFFICE.

ELNATHAN COLE, OF LOS ANGELES, CALIFORNIA.

GRAVEL-TRAP AND AIR-CHAMBER.

968,124.  Specification of Letters Patent.  Patented Aug. 23, 1910.

Application filed December 8, 1909. Serial No. 532,107.

*To all whom it may concern:*

Be it known that I, ELNATHAN COLE, a citizen of the United States, residing in the city of Los Angeles, State of California, have invented a new and useful Combination Gravel-Trap and Air-Chamber, of which the following is a specification.

An object of this invention is to provide a more simple, durable and inexpensive strainer construction for a device adapted to be permanently installed in the water supply pipe of a dwelling house, or any other like situation, for the purpose of preventing gravel and the like inorganic substance from passing through the faucet or other valve, thereby causing wear of such faucet or valve.

The invention is adapted to be installed in any water system.

Another object of the invention is to provide a gravel trap furnished with an air chamber to prevent the water-hammer caused by the sudden turning off of the water, and at the same time to assist in keeping clean the screen for arresting the entrance of the gravel.

Figure 1:
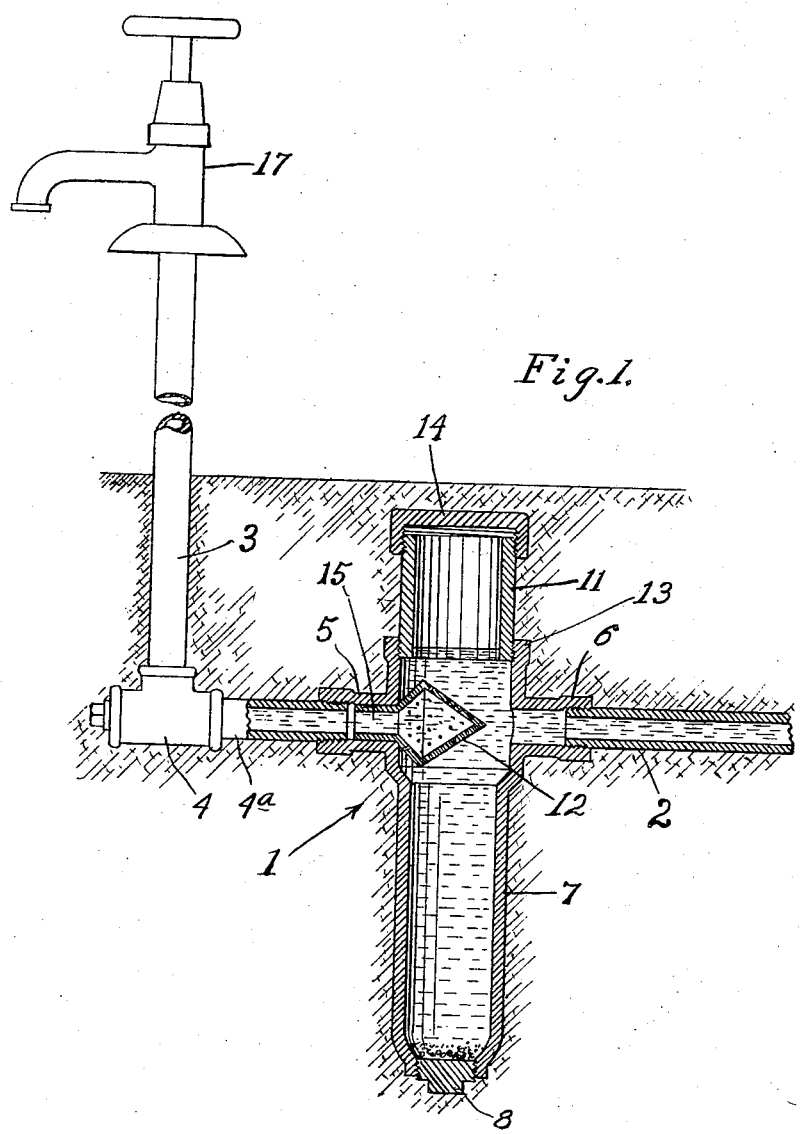
Figure 2:
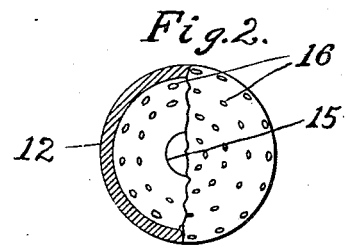

Referring in detail to the accompanying drawing which illustrates the invention, Figure 1 is a side view partly in section of a water supply pipe provided with the appliance. The trap is shown in section. Fig. 2 is a front view partly in section of the screen for arresting the gravel.

Referring in detail to the drawings, 1 is an upright hollow body which forms an air chamber projecting above and below the service pipe 2. The supply pipe 3 communicates with said body 1 desirably through an elbow 4 and connection 4ª. The body 1 may be provided with a recessed projection 5 on one side and a like recessed projection 6 on the other side, said projections respectively communicating with the fitting 4ª and the service pipe 2 which leads horizontally thereinto.

A lower extension 7 of the body 1 constitutes a gravel trap said extension being provided at its lower end with a removable plug 8, to provide for cleaning out the trap.

An upper extension 11 of body 1 constitutes an air chamber for preventing water-hammer and for automatically cleaning the screen 12 as will hereinafter be more fully explained. The air chamber 11 consists of a tubular extension or pipe having an externally threaded lower end for screwing into the upper flanged end 13 of the portion of body 1 therebeneath, and a closure cap 14 screwing onto the upper end of said air chamber. When the pipe section 11 is unscrewed from the body of the trap access may be readily had to the interior of said body to insert remove or clean the screen 12. It will therefore be seen that, if a large air chamber is desired, the pipe section 11 may be made as long as may be necessary to secure the required amount of air space and access to the interior of the trap may be had just as readily by unscrewing the pipe section 11 instead of removing the cap 14.

Referring now to the screen 12, which is shown in detail in Fig. 2, said screen is desirably cast out of brass, being formed with a reduced tubular portion 15 adapted to fit tightly within the recessed portion 5, said screen is provided with a multiplicity of holes or perforations 16 which may be formed by drilling. Said screen 12 is provided with an enlarged head conical in shape, the apex of the cone projecting toward and being opposite to the inlet 6, said screen 12 may be somewhat longer from end to end than the internal diameter of the body 1, but must not be so long but that when the apex thereof is caused to enter the inlet 6 the tubular portion of the screen may be brought into alinement and inserted within the outlet 5. The body 12 which forms the screen consists of a metal shell of sufficient strength to provide for long wear and capable of withstanding heavy pressure when the same is applied from a bar or small pipe which may be inserted through the pipe 6 to crowd the reduced portion or shank 15 of the body 12 into place within the pipe 5 as shown in Fig. 1. This construction avoids the necessity of using bolts and bolt holes, and consequently avoids danger of leakage as well as extra labor in putting the strainer in place.

In operation the screen 12 arrests gravel and other foreign matter causing the same to fall to the bottom of the trap, which may be cleaned out after the plug 8 is removed. The screen is automatically prevented from clogging for the reason that whenever the supply is turned off suddenly by reason of the operation of the faucet 17, or like valve the water-hammer or rebound from the outlet pipe 3 ejects any matter which may have accumulated in the perforations 16 and causes said matter to drop to the bottom of the trap.

The body 1 of the appliance is desirably tubular in form, the lower extension 7 being spacious enough to contain all the gravel and other deposits which will be apt to be arrested by the device for a long time. Said body will, in practice, ordinarily be buried in the earth beneath or near to the foundation of a dwelling house, which will make it necessary to dig into the earth a little distance before access can be had to the cap 8 to remove said cap for the purpose of cleaning out the deposits. This will only have to be done at long intervals, however, on account of the spacious extension 7 being adapted to retain a large amount of deposit.

I claim:

In combination, an inlet conduit, a chamber into which said conduit leads, an outlet conduit opposite to said inlet conduit, a perforated metal head to form a strainer, said head being disposed opposite to the inlet conduit and being adapted to withstand pressure applied by an instrument inserted through said inlet conduit, and a hollow, horizontally extending shank formed as a continuation of said head and having a force-fit within said outlet conduit, said shank being adapted to be driven into said outlet conduit by force applied to said head through said inlet, said head being supported solely by said shank, said head overhanging a clear space in said chamber.

In testimony whereof I have hereunto signed my name in the presence of two subscribing witnesses at Los Angeles, in the county of Los Angeles and State of California, this second day of December 1909.

ELNATHAN COLE.

Witnesses:
ALBERT H. MERRILL,
FLORA H. FOSS.